(12) United States Patent
Alabbasi et al.

(10) Patent No.: US 12,302,313 B2
(45) Date of Patent: May 13, 2025

(54) RADIO NETWORK NODE, USER EQUIPMENT (UE) AND METHODS PERFORMED IN A WIRELESS COMMUNICATION NETWORK

(71) Applicant: Telefonaktiebolaget LM Ericsson (PUBL), Stockholm (SE)

(72) Inventors: Abdulrahman Alabbasi, Kista (SE); Zhenhua Zou, Solna (SE); Torsten Dudda, Wassenberg (DE); Yufei Blankenship, Kildeer, IL (US); John Walter Diachina, Garner, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1014 days.

(21) Appl. No.: 17/279,971

(22) PCT Filed: Sep. 27, 2019

(86) PCT No.: PCT/SE2019/050932
§ 371 (c)(1),
(2) Date: Mar. 25, 2021

(87) PCT Pub. No.: WO2020/067985
PCT Pub. Date: Apr. 2, 2020

(65) Prior Publication Data
US 2021/0392664 A1    Dec. 16, 2021

Related U.S. Application Data

(60) Provisional application No. 62/737,138, filed on Sep. 27, 2018.

(51) Int. Cl.
*H04W 72/12* (2023.01)
*H04W 72/0446* (2023.01)
(Continued)

(52) U.S. Cl.
CPC ... *H04W 72/1268* (2013.01); *H04W 72/0446* (2013.01); *H04W 72/0453* (2013.01);
(Continued)

(58) Field of Classification Search
CPC ... H04L 5/0053; H04L 5/0096; H04L 5/0078; H04L 1/1887; H04W 72/541;
(Continued)

(56) References Cited

U.S. PATENT DOCUMENTS 10,638,497 B2 *  4/2020  Islam ............... H04L 5/0094
10,728,002 B2 *  7/2020  Islam ............... H04L 5/0053
(Continued)

FOREIGN PATENT DOCUMENTS

CN      108293263 A      7/2018
WO      2018 009548 A1   1/2018
(Continued)

OTHER PUBLICATIONS

First Office Action Notification issued for Chinese Application No. 201980063734.5—Aug. 25, 2023.
(Continued)

*Primary Examiner* — Jung Liu
*Assistant Examiner* — Jung-Jen Liu
(74) *Attorney, Agent, or Firm* — Baker Botts L.L.P.

(57) ABSTRACT

Embodiments herein disclose e.g. a method performed by user equipment, UE, (10) for handling uplink, UL, communications in a wireless communication network. The UE (10) receives from a radio network node (12), an indication with an uplink grant, wherein the indication indicates that a radio resource scheduled by the UL grant for UL transmission is for a type of data. The UE (10) uses the radio resource for transmission of that type of data.

26 Claims, 11 Drawing Sheets

(51) Int. Cl.
  *H04W 72/0453* (2023.01)
  *H04W 72/1268* (2023.01)
  *H04W 72/21* (2023.01)
  *H04W 72/23* (2023.01)
  *H04W 72/566* (2023.01)

(52) U.S. Cl.
  CPC .......... *H04W 72/21* (2023.01); *H04W 72/23* (2023.01); *H04W 72/566* (2023.01)

(58) Field of Classification Search
  CPC ... H04W 74/04; H04W 52/50; H04W 52/146; H04W 72/23; H04W 74/0808; H04W 72/1268; H04W 72/0446; H04W 72/0453; H04W 72/566; H04W 72/21
  See application file for complete search history.

(56) References Cited

U.S. PATENT DOCUMENTS

| | | | | |
|---|---|---|---|---|
| 11,115,257 | B2* | 9/2021 | Islam | H04L 1/0038 |
| 11,121,815 | B2* | 9/2021 | Ma | H04L 1/1864 |
| 11,122,576 | B2* | 9/2021 | Hwang | H04L 5/0053 |
| 11,252,717 | B2* | 2/2022 | Islam | H04L 27/26025 |
| 2018/0035459 | A1* | 2/2018 | Islam | H04L 5/0053 |
| 2018/0063865 | A1* | 3/2018 | Islam | H04L 5/0064 |
| 2018/0070341 | A1* | 3/2018 | Islam | H04L 5/0064 |
| 2018/0092104 | A1* | 3/2018 | Sheng | H04W 74/08 |
| 2018/0220440 | A1 | 8/2018 | Dudda et al. | |
| 2018/0278454 | A1* | 9/2018 | Islam | H04L 1/0038 |
| 2018/0324830 | A1* | 11/2018 | Islam | H04L 5/0053 |
| 2019/0052432 | A1* | 2/2019 | Islam | H04L 5/0053 |
| 2019/0280802 | A1* | 9/2019 | Ma | H04W 72/0446 |
| 2019/0327757 | A1* | 10/2019 | Oteri | H04L 5/0053 |
| 2021/0212067 | A1* | 7/2021 | Hwang | H04L 5/0053 |
| 2021/0307032 | A1* | 9/2021 | Osawa | H04W 72/569 |

FOREIGN PATENT DOCUMENTS

| | | |
|---|---|---|
| WO | 2018 085485 A1 | 5/2018 |
| WO | 2018 129948 A1 | 7/2018 |

OTHER PUBLICATIONS

Search Report issued for Chinese Application No. 2019800637345—Aug. 24, 2023.
3GPP TS 38.331 v15.6.0; Technical Specification; 3rd Generation Partnership Project; Technical Specification Group Radio Access Network; NR; Radio Resource Control (RRC) protocol specification (Release 15)—Jun. 2019.
PCT International Search Report issued for International application No. PCT/SE2019/050932—Dec. 5, 2019.
PCT Written Opinion of the International Searching Authority issued for International application No. PCT/SE2019/050932—Dec. 5, 2019.

* cited by examiner

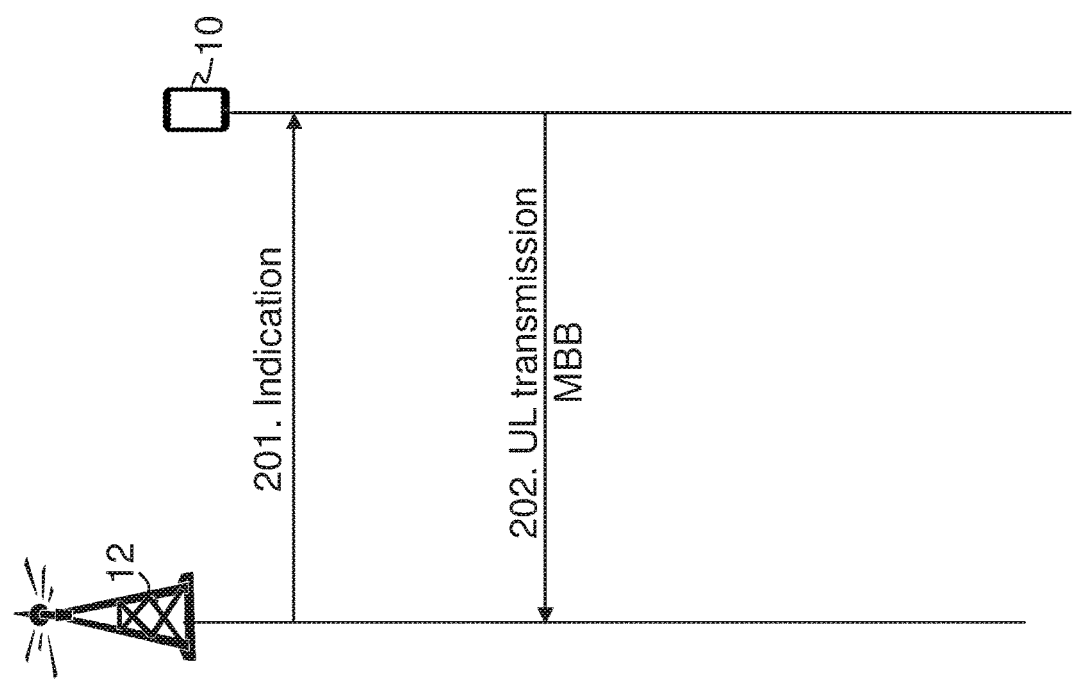

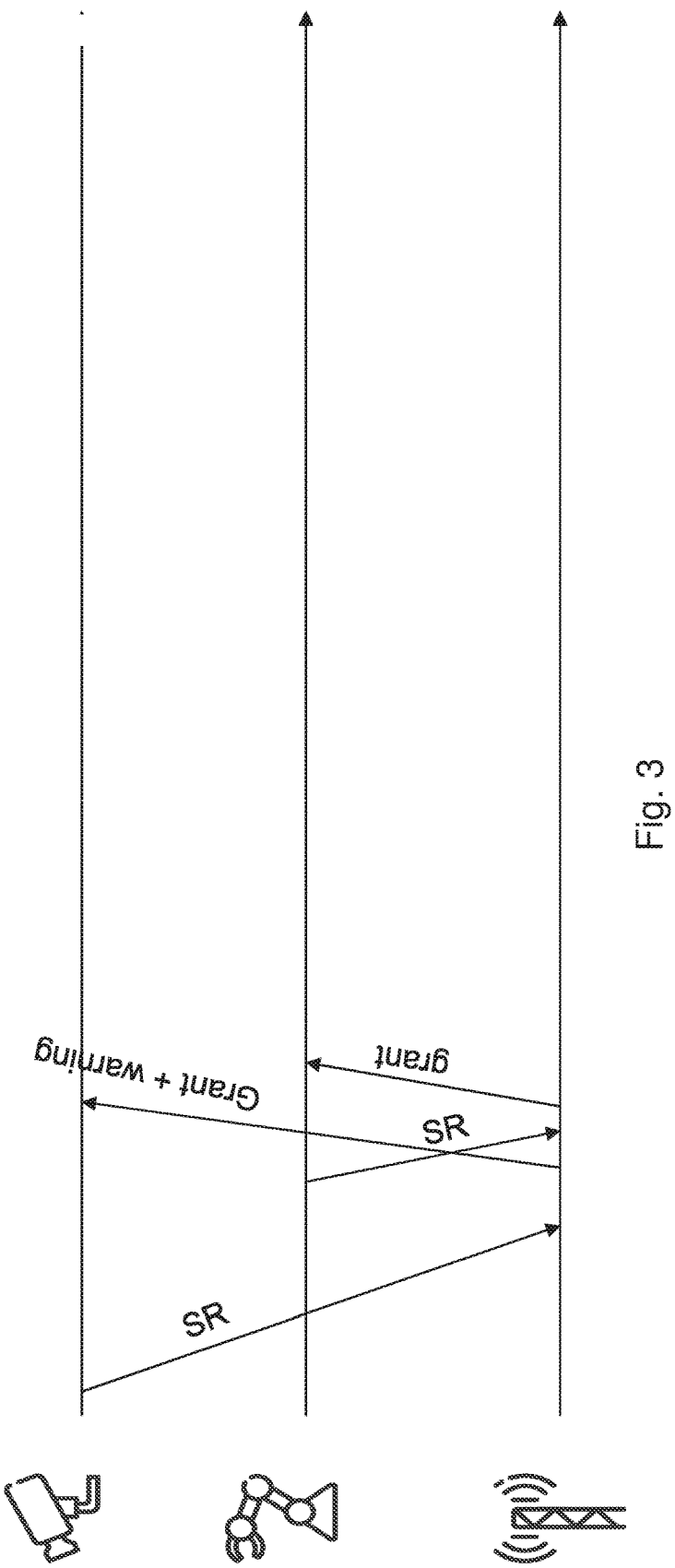

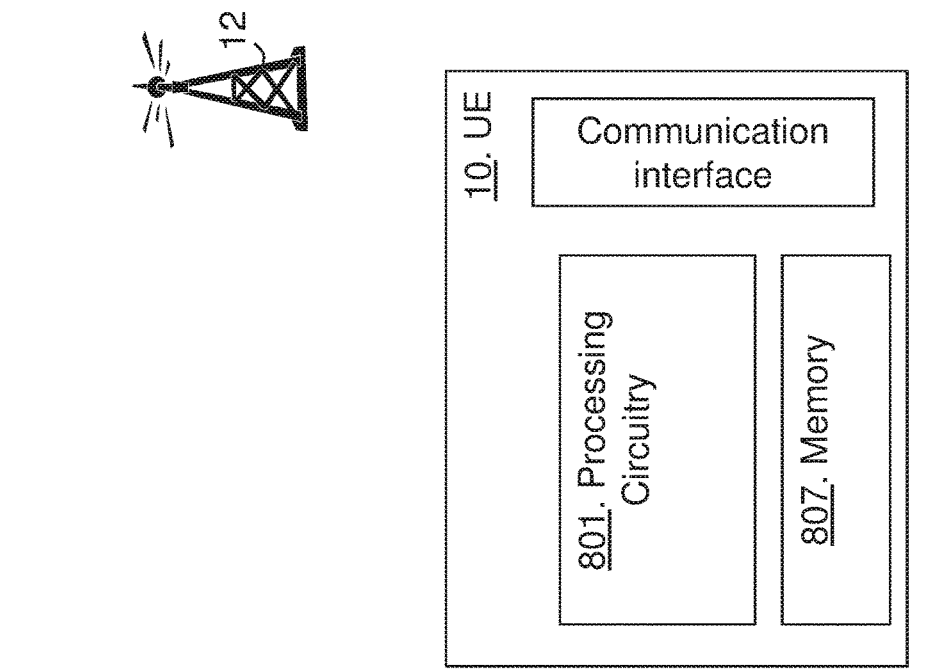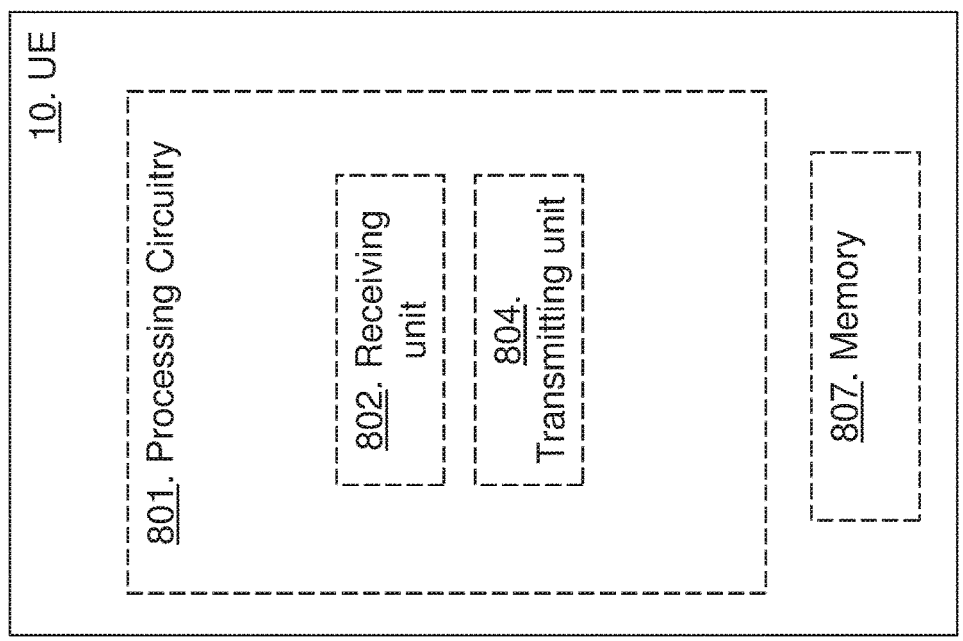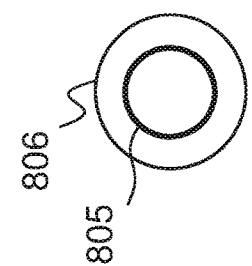
Fig. 4

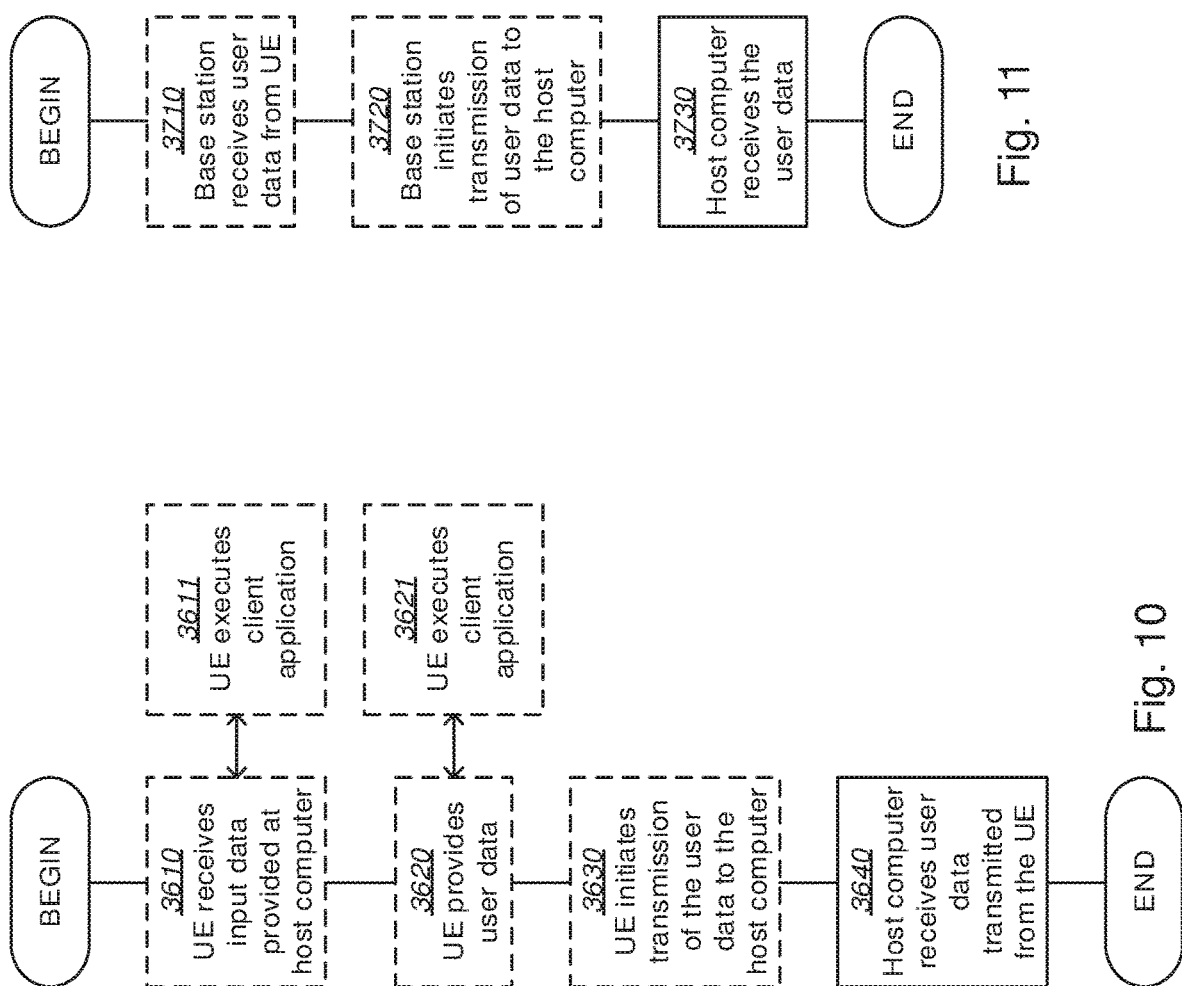

RADIO NETWORK NODE, USER EQUIPMENT (UE) AND METHODS PERFORMED IN A WIRELESS COMMUNICATION NETWORK

PRIORITY

This nonprovisional application is a U.S. National Stage Filing under 35 U.S.C. § 371 of International Patent Application Serial No. PCT/SE2019/050932 filed Sep. 27, 2019 and entitled "Radio Network Node, User Equipment (UE) and Methods Performed in a Wireless Communication Network" which claims priority to U.S. Provisional Patent Application No. 62/737,138 filed Sep. 27, 2018 both of which are hereby incorporated by reference in their entirety.

TECHNICAL FIELD

Embodiments herein relate to a radio network node, a user equipment (UE) and methods performed therein regarding wireless communication. Furthermore, a computer program product and a computer-readable storage medium are also provided herein. Especially, embodiments herein relate to handling or enabling communication, e.g. handling uplink (UL) grants of transmissions, for the UE in a wireless communication network.

INTRODUCTION

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio NR, the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

In a newly defined 3GPP study item (RP-182090, Revised SID: Study on NR Industrial Internet of Things (IoT)), NR technology enhancements are studied with the target of providing more deterministic low-latency delivery of data.

UL traffic can be scheduled with dynamic UL grants or configured UL grants. In case of dynamic UL grants, the radio network node provides an UL grant to the UE for each UL transmission. Configured UL grants are pre-allocated, i.e. provided once to the UE, thereafter the configured UL grant is valid for usage for UL transmissions according to a configured periodicity and reliability. The UE does not need to transmit padding on those UL resources if no UL data is available for transmission, i.e. the UE may skip an UL transmission on such grants.

A typical NR-IoT device would handle communication for multiple service types, e.g. periodic Ultra-reliable low latency communication (URLLC) type robot control messages, URLLC type of occasional alarm signals, for which periodic resources would need to be configured (in the interest of realizing low delay), occasional sensor data transmission, other mobile broadband (MBB) type traffic such as occasional video transmissions or software updates. It would lead to a traffic mix to be multiplexed by the UE for UL transmissions, i.e. on medium access control (MAC) multiple logical channels with different priorities would need to be configured.

Periodic URLLC traffic must be delivered for a given UE with a deterministic latency, i.e. robust transmissions must be guaranteed which is costly in terms of resource usage. On the other hand, sensor data or MBB type of traffic must be served as well, for which resources should be used as efficiently as possible, i.e. less robust data transmission is allowed and therefore fewer resources are needed for this type of traffic. It is currently unclear how UE multiplexing of both traffic types with their different requirements can be efficiently handled in the NR system.

NR should support different types of services having different latency requirements and priorities, e.g. URLLC and enhanced Mobile Broadband (eMBB) services. Release (Rel)-15 NR already supports mechanisms to accommodate serving of mixed traffic types both in UL and DL. This includes a resource scheduling flexibility from the mini-slot to slot and multi-slots level by enabling fine granularity for monitoring DL transmissions, possibility for scheduling request (SR) transmission in a fraction of a slot, DL and UL Semi Persistent scheduling (SPS) for configuring resources in DL and UL to reduce signaling and delay overhead, and pre-emption of DL transmissions as needed to prioritize sporadic and urgent DL transmissions.

For DL transmissions the radio network node may pre-empt already scheduled DL transmissions to enable DL transmission of traffic with high priority and low latency—requirements for intended UEs with minimal delay after the arrival of such traffic at the radio network node. Support of a similar mechanism can be considered for UL transmissions in NR where already scheduled or on-going UL transmissions need to be pre-empted due to the arrival of high-priority and urgent UL traffic for the different UEs served in a given cell.

Based on the request from some UEs for urgent transmission of high priority UL traffic, e.g. URLLC traffic, the gNB needs to provide resources to accommodate transmissions as soon as possible to meet the delay requirements. It can happen that the gNB has already assigned the suitable UL resources to other LCHs used by the same UE or to one or multiple other UEs for UL transmissions with less stringent requirements in terms of delay e.g. eMBB traffic. Hence, the gNB needs to re-schedule those resources for the prioritized URLLC transmissions.

How to support dynamic resource sharing between eMBB UL traffic and URLLC UL traffic from different UEs is under discussion.

Options include:
1. An eMBB UE may be ordered to pre-empt already scheduled transmissions on a first resource to enable transmission of traffic with a higher priority from a URLLC UE using a second resource that overlaps with the first resource. The eMBB UE cancels UL transmissions using the first resource when an explicit indication to do so is detected. The indication may e.g. be that the eMBB UE receives downlink control information (DCI) to assign a new grant to transmit the pre-empted eMBB data using an alternate/new resource instead of the first resource.
2. URLLC UE receives DCI informing it to transmit over the same resource being used by the eMBB UE transmission wherein the eMBB UE is not told to cancel its UL transmission. The transmission power for URLLC UE is boosted and/or transmission power for eMBB UE is reduced.

One scenario can be that an eMBB UE is configured with a configured grant resource, for example, to reduce an initial alignment delay from the scheduling request, or to support a periodic data flow with a stochastic probability of packet arrival at each instance. Since the eMBB UE can skip transmission on the configured grant if no MAC PDU is obtained (available for transmission), the radio network node might schedule a dynamic grant for a URLLC UE on a resource that overlaps with the CG resource of the URLLC UE.

Irrespective of the enabling mechanism associated with the two options above, i.e. muting per option 1 or power control per option 2, this may have impact on the performance of the eMBB traffic from the eMBB UE since its UL transmission is either canceled on the first resource and subject to delay due to using a new grant per option 1 or experiences low power relative to the transmission from the URLLC UE per option 2. This may impact the reliability and latency, considering the delayed transmission, of the pre-empted eMBB traffic. However, such inter-UE UL pre-emption may still be acceptable as long as the eMBB UE traffic latency requirements can still be satisfied whenever it experiences a pre-emption per option 1.

In addition, instead of simply categorizing into either URLLC UE or eMBB UE, a UE might support mixed eMBB traffic and URLLC traffic. The problem in this case is that a UE with mixed traffic would typically prioritize URLLC traffic which, if available, is then subject to cancellation with re-scheduling per option 1/low-power transmission per option 2, hence having impact on the latency and reliability of the URLLC traffic. The radio access network may perform pre-emption of the mixed traffic UE according to options 1 or 2 above simply because it cannot be sure whether that UE will have URLLC traffic to send when it decides to apply pre-emption. If URLLC traffic is available when pre-emption is applied then it results in a reduced or limited performance of the wireless communication network in support of the mixed traffic UE.

SUMMARY

An object of embodiments herein is to provide a mechanism that improves the performance of the wireless communication network when UEs support different types of traffic or a combination of types of traffic.

According to an aspect the object is achieved by providing a method performed by a UE for handling UL communications in a wireless communication network. The UE receives from a radio network node an indication with an uplink grant, wherein the indication indicates that a radio resource scheduled by the uplink grant for UL transmissions is for a type of data, e.g. non critical data. The UE then uses the radio resource for transmission of that type of data. In the method outlined herein, the UE may receive the indication, received e.g. by a UE MAC entity, indicating that high priority data should not be transmitted on an indicated UL resource. The indication may be applicable to the indicated UL resource for an UL grant or a time-frequency region. The indication may also include a time-validity for the indicated UL resource.

According to another aspect the object is achieved by providing a method performed by a radio network node for handling communications, such as UL transmissions from a UE, in a wireless communication network. The radio network node schedules a UE with a radio resource for an UL data transmission, wherein a first radio resource is more reliable in transmission than a second radio resource, wherein the first radio resource and the second radio resource are scheduled for different types of data traffic. E.g. schedule radio resources for UL transmissions over different radio resources wherein the first radio resource is more reliable in transmission than the second radio resource. The radio network node may schedule the first and second radio resource for different types of data traffic or data e.g.

schedule the second radio resource for a certain type of data traffic or data. The radio network node further sends an indication with an uplink grant to the UE when scheduling the radio resource for the UL data transmission, wherein the indication indicates that the scheduled radio resource for the UL data transmission is for a type of data. E.g. the indication indicates that radio resource for UL transmissions is for the certain type of data, such as non-critical data.

According to still another aspect the object is achieved by providing a UE for handling UL communications in a wireless communication network. The UE is configured to receive from a radio network node, an indication with an uplink grant, wherein the indication indicates that a radio resource scheduled by the UL grant for UL transmission is for a type of data. The UE is further configured to use the radio resource for transmission of that type of data.

According yet still another aspect the object is achieved by providing a radio network node for handling communications in a wireless communication network. The radio network node is configured to schedule a UE with a radio resource for an UL data transmission, wherein a first radio resource is more reliable in transmission than a second radio resource, and wherein the first radio resource and the second radio resource are scheduled for different types of data traffic. The radio network node is further configured to send an indication with an uplink grant to the UE, when scheduling the radio resource for the UL data transmission, wherein the indication indicates that the scheduled radio resource for UL transmissions is for a type of data.

It is furthermore provided herein a computer program product comprising instructions, which, when executed on at least one processor, cause the at least one processor to carry out any of the methods above, as performed by the radio network node, or the UE. It is additionally provided herein a computer-readable storage medium, having stored thereon a computer program product comprising instructions which, when executed on at least one processor, cause the at least one processor to carry out the method according to any of the methods above, as performed by the radio network node, or the UE.

It is herein disclosed a method executed at the radio network node wherein the indication is transmitted to the UE, wherein the indication indicates that e.g. a resource for UL transmissions is for a certain type of data, e.g. high priority data should not be transmitted on an indicated UL resource. The indication may indicate the UL resource for an UL grant or a time-frequency region. The indication may also include a time-validity, i.e. time interval for which the indication is valid. The indication may indicate UL resources that may be preempted by other data transmissions. Thus, a UE with mixed traffic can receive an indicator indicating it may not transmit priority traffic such as URLLC traffic using an indicated UL resource if the UL resource might be preempted (i.e., not robust), and thus the requirement for the priority traffic is fulfilled. This leads to an improved performance of the wireless communication network.

BRIEF DESCRIPTION OF THE DRAWINGS

Embodiments will now be described in more detail in relation to the enclosed drawings, in which:

FIG. 2a is a combined signalling scheme and flowchart according to embodiments herein;

FIG. 3 is a signalling scheme according to embodiments herein;

FIG. 4 is a block diagram depicting a UE according to embodiments herein;

FIGS. 8-11 are flowcharts illustrating methods implemented in a communication system including a host computer, a base station and a user equipment.

DETAILED DESCRIPTION

Embodiments herein are described within the context of 3GPP NR radio technology (3GPP TS 38.300 V15.2.0 (2018-06)). It is understood, that the problems and solutions described herein are equally applicable to wireless access networks and user-equipments (UEs) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1:
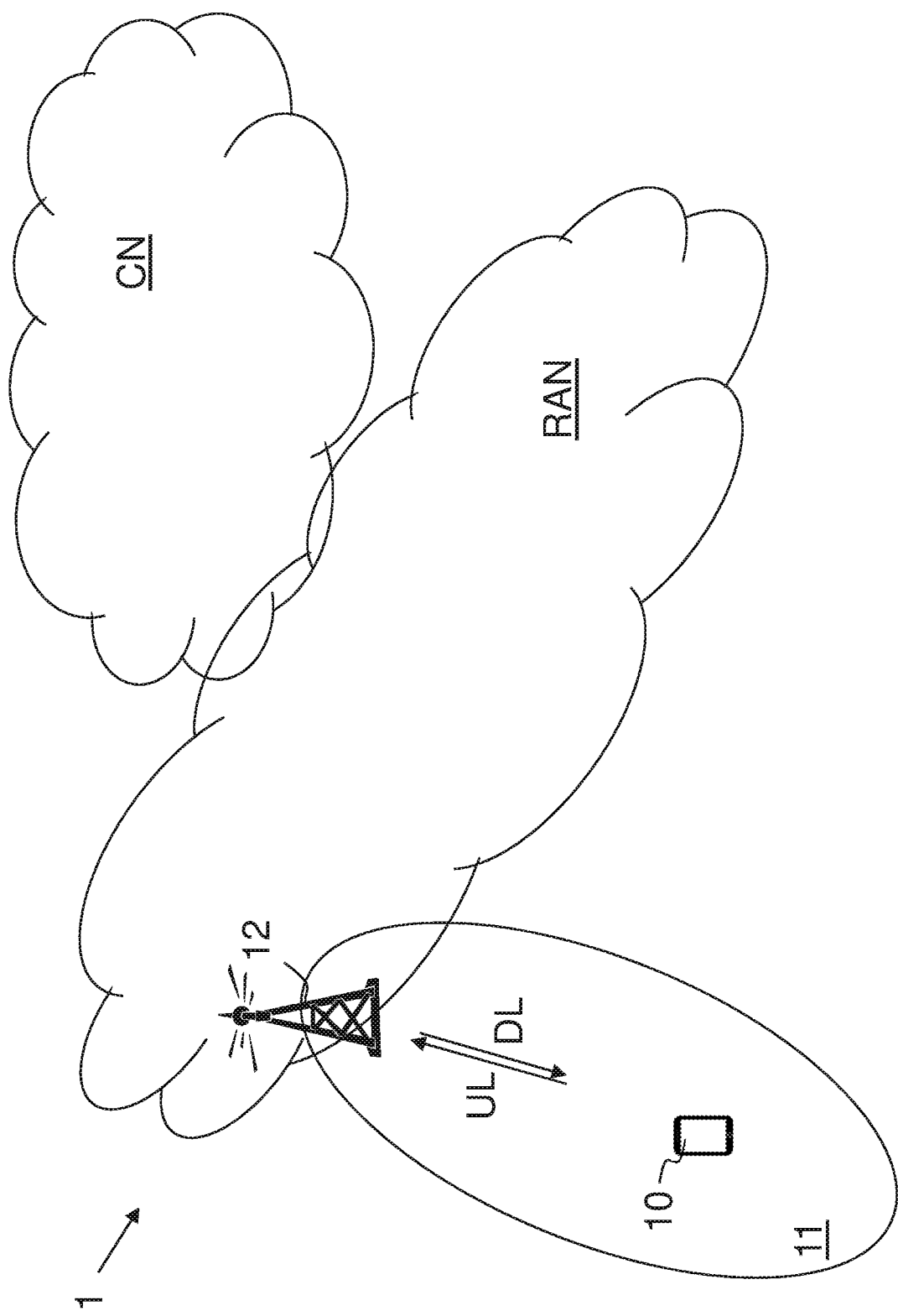
FIG. 1 is a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use one or a number of different technologies, such as W-Fi, Long Term Evolution (LTE), LTE-Advanced, Fifth Generation (5G), Wideband Code Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a UE 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a radio network node 12 providing radio coverage over a geographical area, a first service area 11, of a first radio access technology (RAT), such as LTE, Wi-Fi, WiMAX or similar. The first radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the first network node 12 depending e.g. on the first radio access technology and terminology used. The first radio network node 12 may alternatively or additionally be a controller node or a packet processing node such as a radio controller node or similar. The radio network node may be referred to as a serving network node wherein the first cell may be referred to as a serving cell, and the radio network node 12 communicates with the UE 10 in form of DL transmissions to the UE 10 and UL transmissions from the UE 10.

It should be noted that a service area may be denoted as cell, beam, beam group or similar to define an area of radio coverage.

The radio network node 12 may transmit RSs, such as cell specific reference signals (CRS), over respective service area. Hence, the radio network node 12 may transmit reference signals for mobility purposes of UEs, such as CRS or beam reference signals (BRS), repeatedly, in time, in a large number of different directions using as many transmission (Tx)-beams as deemed necessary to cover an operational area of the respective radio network node. Hence the radio network node 12 provides radio coverage over the first service area using a first reference signal, e.g. first CRS, for identifying the first service area 11 in the wireless communication network.

A scenario is herein assumed wherein UEs, such as the UE 10, with different traffic types, also referred to as types of data, are in the network:
  UEs may belong to group C of UEs, e.g., URLLC, which have critical traffic.
  UEs may belong to group E of UEs, e.g., eMBB, which have non-critical traffic with lower priority traffic than those considered critical traffic.
  UEs may belong to group M of UEs, e.g. mixed traffic UEs, which have mixed types of data such as critical and non-critical traffic.

The radio network node 12 may schedule UE-C's UL transmission so that it might preempt radio resources of some of the UL transmissions scheduled for groups of UE-E or UE-M. The embodiments herein may further indicate with an indication to the other UEs, e.g. UE-E and UE-M, that UL resources for UL transmissions are for a certain type of data, e.g. non critical data. Type may be defined by how critical the data is or latency requirement of the data. E.g. the radio network node 12 may indicate to the UE 10 that the radio resource R is scheduled for high latency requirement data from a second UE and the UE 10 may then avoid using that radio resource for high priority data for itself. This is especially advantageous when the UE comprises mixed types of data traffic.

FIG. 2a is a combined flowchart and signalling scheme according to embodiments herein. The actions may be performed in any suitable order.

Action 201. The radio network node 12 sends an indication to the UE 10. The indication indicates that UL resources for UL transmissions are for a certain type of data, e.g. non critical data.

Action 202. The UE 10 sends e.g. non critical data on the UL resources. Or in an implicit manner, the radio network node 12 indicates that the critical data should not be sent of the radio resource, i.e. indicates that the radio resource is for non-critical data and thus the UE sends non-critical data on the radio resource.

Figure 2B:
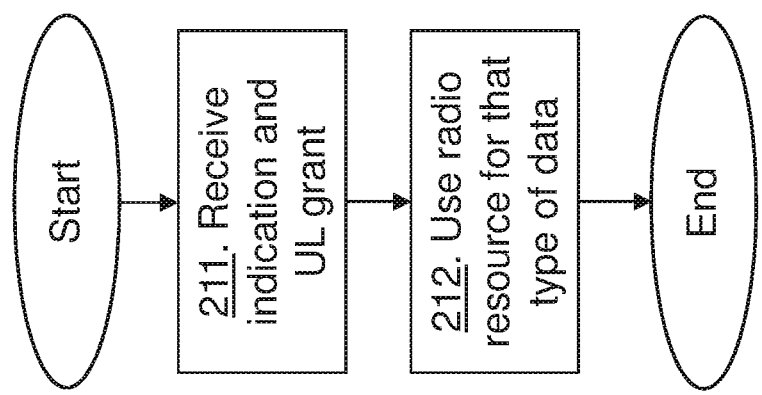
FIG. 2b is a flowchart depicting a method performed by a user equipment according to embodiments herein.
Figure 2C:
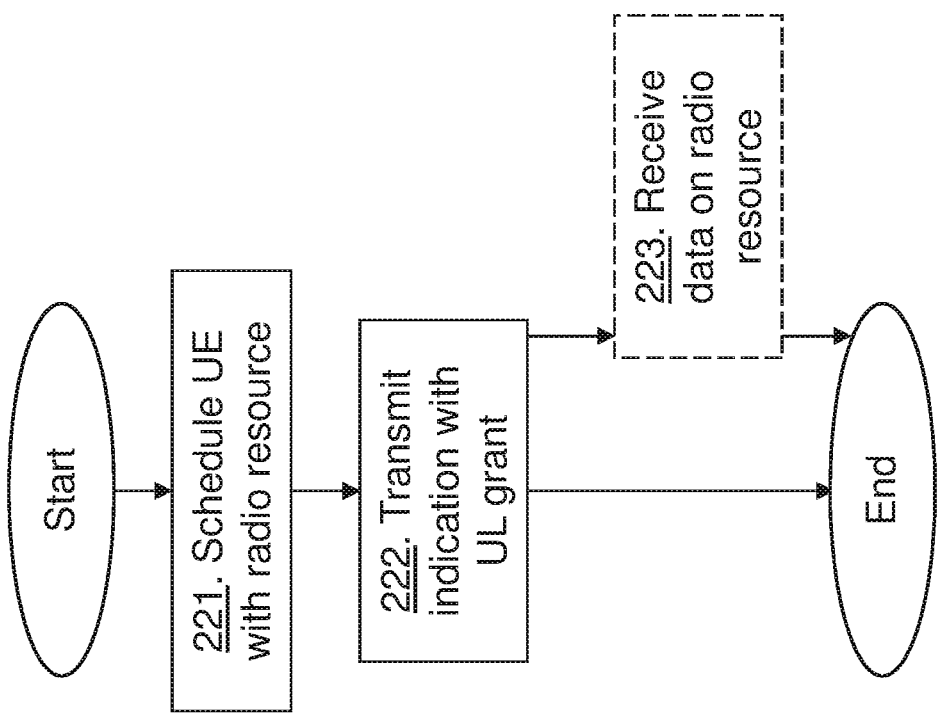
FIG. 2c is a flowchart depicting a method performed by a radio network node according to embodiments herein.

The method actions performed by the UE 10 for handling UL communications in the wireless communication network 1 according to embodiments will now be described with reference to a flowchart depicted in FIG. 2b. The actions do not have to be taken in the order stated below, but may be taken in any suitable order. Actions performed in some embodiments are marked with dashed boxes.

Action 211. The UE 10 receives from the radio network node 12, the indication with the uplink grant, wherein the indication indicates that a radio resource scheduled by the UL grant for UL transmission is for a type of data. The UL grant may be for the type of data. E.g. the UE 10 may receive an UL grant allocating an UL resource and including the indication, received by a UE MAC entity. The indication may indicate that high priority data should not be transmitted on the allocated UL resource, thus, the indication may indicate that other priority data should be transmitted on the UL resource. The indication may indicate indirectly that the radio resource scheduled for UL transmission is for the type of data by indicating that high priority data should not be transmitted on the radio resource scheduled for UL transmission and the UE avoids transmitting high priority data on the radio resource. E.g. a configured grant (CG) may have a semi-static configuration, so original some type of data might have been intended to go over the CG, but based on the other UEs transmission of higher critical traffic, the radio network node 12 may inform the UE 10 that it might be pre-empted, temporarily not all CG repeated occasion, only the next one, hence this message would be quick. The indication may be indicating the radio resource subject to pre-emption and/or the radio resource is not robust. Subject to pre-emption meaning that it is not always pre-empted by other data transmissions but might be. E.g. the indication may be indicating the radio resource not to be used for high priority data transmissions and/or the radio resource that is not robust. The indication may be a warning message transmitted on a higher-layer, to indicate a time-frequency resource that is subject to pre-emption of transmissions. E.g. the warning message as the indication can be sent dynamically, for example, as an indicator in the UL-grant DCI. The indication may include a time duration for which the indication is valid. The indication may indicate the radio resource to be subject to pre-emption. Embodiments herein thus show a solution wherein the indication is received by the UE MAC entity in the UE 10 specific to the UL grant, wherein the indication indicates e.g. that high priority data should not be transmitted on the UL resources of the UL grant. The indication may indicate that the transmission resources are not robust, i.e. that a potential transmission on those resources is likely to fail. It may in particular indicate that the transmission resources may be subject to pre-emption. The indication may be a realized semi-statically e.g. by radio resource control (RRC) signaling. Alternatively, a warning message as the indication can be sent dynamically, for example, as an indicator in the UL-grant DCI. The indication may be or be in a warning message that may be sent by the radio network node 12 to the preempted UEs, e.g. UE-m or UE-e. This warning message can potentially specify: The resources (time and frequency) which might be pre-empted/not robust; and/or the receiving UEs (e.g. preempted UEs) take actions to avoid sending high priority data on these resources.

Action 212. The UE 10 uses the radio resource for transmission of that type of data. E.g. in response to receiving the indication, the UE 10 may omit transmission of data for one or more logical channels using the allocated UL resource. Thus, the one or more logical channels (LCHs) may be restricted from transmitting data using the allocated UL resource upon reception of the indication. The UE may use under a restriction indicating that pre-emption of transmissions is not allowed for a logical channel, and wherein data of such logical channel is not allowed to be transmitted when the indication is received and pointing at the resource of the UL grant. E.g. the restriction may be pre-emption of transmissions is not allowed for a logical channel, and wherein data of such logical channel is not allowed to be transmitted on the resource of the UL grant when the indication is received and indicates the resource of the UL grant is subject to pre-emption. The UE may use under a restriction indicating that pre-emption of high priority data transmissions on the radio resource is to be enforced for all logical channels supporting high priority data that have access to that radio resource only if the probability of high priority data being available for those logical channels is greater than x %. The UE may use the radio resource by transmitting data on the radio resource subject to pre-emption, if pre-emption probability is less than x %. Thus x being a threshold. The UE may use under a restriction indicating that pre-emption of high priority data transmissions on the radio resource is to be enforced for all logical channels supporting high priority data that have access to that radio resource. The UE may use the radio resource by the UE avoiding multiplexing high priority uplink control information, e.g. being a second type of traffic, onto a best-effort physical uplink shared channel, PUSCH, transmission, e.g. being a first type of traffic.

The method actions performed by the radio network node 12 for handling communications in the wireless communication network 1 according to embodiments will now be described with reference to a flowchart depicted in FIG. 2b. The actions do not have to be taken in the order stated below, but may be taken in any suitable order. Actions performed in some embodiments are marked with dashed boxes.

Action 221. The radio network node 12 schedules the UE 10 with a radio resource for an UL data transmission, wherein a first radio resource is more reliable in transmission than a second radio resource, wherein the first radio resource and the second radio resource are scheduled for different types of data traffic.

Action 222. The radio network node 12 then transmits the indication with the UL grant to the UE 10, when scheduling the radio resource for the UL data transmission, wherein the indication indicates that the scheduled radio resource for the UL data transmission is for a type of data. As stated above the indication may indicate indirectly that the radio resource scheduled for the UL transmission is for the type of data by indicating that high priority data should not be transmitted on the radio resource scheduled for UL transmission and the UE avoids transmitting high priority data on the radio resource. The indication may be indicating the radio resource subject to pre-emption and/or being not robust. The method may comprise a restriction indicating that pre-emption of transmissions is not allowed for a logical channel, and wherein data of such logical channel is not allowed to be transmitted when the indication is received pointing at the radio resource of the UL grant. The indication may be a warning message transmitted on a higher-layer, to indicate a time-frequency resource that is subject to pre-emption of transmissions. The indication may include a time duration for which the indication is valid. The indication may indicate that the UE 10 avoids multiplexing high priority uplink control information onto best-effort physical uplink shared channel, PUSCH, transmission. The indication may indicate the radio resource to be subject to pre-emption.

Action 223. The radio network node 12 may then receive data on the radio resource to be pre-empted if pre-emption probability is less than x %.

In a first embodiment, the indication such as the warning message mentioned above may be delivered to the MAC entity of the UE 10 for a logical channel prioritization (LCP) restriction. See below for an example wherein text related to embodiments herein are underlined The MAC entity may in the UE, when a new transmission is performed:
1> select the logical channels for each UL grant that satisfy all the following conditions:
2> the set of allowed Subcarrier Spacing index values in allowedSCS-List, if configured, includes the Subcarrier Spacing index associated to the UL grant; and
2> maxPUSCH-Duration, if configured, is larger than or equal to the PUSCH transmission duration associated to the UL grant; and
2> configuredGrantType1Allowed, if configured, is set to TRUE in case the UL grant is a Configured Grant Type 1; and
2> allowedServingCells, if configured, includes the Cell information associated to the UL grant.
2> preemptedAllowed, if configured, is set to TRUE in case the UL grant contains a warning indication from physical layer (PHY).

This indication, i.e. the preemptedAllowed, means that this UL-grant is not reliable. The radio network node sets preemptedAllowed of the URLLC LCH not to be TRUE so that the data from high priority LCH is not sent on this grant, and while for the best effort LCH, preemptedAllowed is set to TRUE.

In an alternative or additional embodiment, a restriction indicating "preemptedNotAllowed" is configured per logical channel, indicating that data of such logical channel is not allowed to be transmitted when the indication such as a warning indication is received pointing at the resources of the UL grant. This way, only URLLC LCH needs to be configured with this configuration, while all other LCHs e.g. eMBB LCH may not be configured and are thus oblivious to the warning indication (ignore it, no restriction for transmission), see FIG. 3

In an embodiment, the indication may be an indicator in the configured grant activation/modification that refers to the recurring configured grants are subject to preemption and should apply the above LCP restriction rule. The indicator for the configured grant may be sent in physical downlink control channel (PDCCH), where the PDCCH performs activation of the relevant configured grant process.

In the second embodiment, the warning message i.e. the indication, can be sent on higher-layer, such as media access control-control element (MAC-CE) and/or radio resource control (RRC) to indicate a time-frequency resource that is subject to the preemption. The MAC LCP can be further written as 2> preemptedAllowed, if configured, is set to TRUE in case the UL grant overlaps with the warning region configured by RRC.

The similar UE actions related to configured grants, described above, can be used here.

In another follow-up embodiment that combines the above first and the second embodiment, the time duration of the warning, e.g. how many configured grants, is subject to preemption may be configured by RRC, or a combination of the downlink control information (DCI) and RRC signalling, in which the DCI points to a row/column index in an RRC table.

The warning indication may include time duration for which the warning is valid, it may be expressed in terms of number of subframes, as a timer/time, until an absolute subframe or system frame number (SFN) number.

The above embodiment addresses the scenario were the pre-empting UE has a deterministic transmission sequence number (TSN) type traffic, which is known ahead of time. Therefore, the radio network node 12 may send a head of time to UEs, via RRC/MAC-CE, that is it with high/certain probability that the UE transmission at such resources (time/frequency) will be pre-empted.

As stated above, the UE 10 may avoid multiplexing high priority uplink control information, such as uplink control information (UCI), onto best-effort physical uplink shared channel (PUSCH) transmission, such as hybrid automatic repeat request (HARQ)-acknowledgement (ACK) and scheduling request (SR). This is especially important for HARQ-ACK in response to DL URLLC data, if a UE with mixed traffic of eMBB and URLLC. UE should delay transmission of such high priority UCI signals. On the other hand, lower priority UCI, such as channel state information (CSI) report, may be fine to be multiplexed with low reliability PUSCH.

In a follow-up embodiment, if the pre-empted UE's critical traffic has a tight latency bound, i.e., cannot wait for next opportunity, the UE 10 may:

transmit on the radio resources which might be pre-empted if the (pre-emption) probability is less than x %. Since the pre-emption probability may be too low to risk exceeding latency requirement, i.e. since the low probability means that the latency requirement will most certainly be fulfilled.

Note that in a general scenario the term "radio network node" can be substituted with "transmission point". Distinction between the transmission points (TPs) may typically be based on CRSs or different synchronization signals transmitted. Several TPs may be logically connected to the same radio network node but if they are geographically separated, or are pointing in different propagation directions, the TPs may be subject to the same mobility issues as different radio network nodes. In subsequent sections, the terms "radio network node" and "TP" can be thought of as interchangeable.

FIG. 4 is a block diagram depicting the UE 10, in two embodiments, for handling communications e.g. handling UL transmissions to the radio network node 12 such as transmitting data on radio resources, in the wireless communication network 1 according to embodiments herein.

The UE 10 may comprise processing circuitry 801, e.g. one or more processors, configured to perform the methods herein.

The UE 10 may comprise a receiving unit 802, e.g. a receiver or a transceiver. The UE 10, the processing circuitry 801, and/or the receiving unit 802 is configured to receive from the radio network node 12, the indication with the uplink grant, wherein the indication indicates that the radio resource scheduled by the uplink grant for UL transmission is for a type of data e.g. receive the indication e.g. the indication in an UL grant, from the radio network node 12. The indication may be indicating the radio resource not to be used for high priority data transmissions and/or the radio resource that is not robust. The indication may be the warning message transmitted on a higher-layer, to indicate the time-frequency resource that is subject to pre-emption e.g. of transmissions. The indication may include the time duration for which the indication is valid. The indication may indicate the radio resource to be subject to pre-emption.

The UE 10 may comprise a transmitting unit 804, e.g. a transmitter or a transceiver. The UE 10, the processing circuitry 801, and/or the transmitting unit 804 is configured to use the radio resource for transmission of that type of data e.g. transmit data, wherein type of data transmitted is based on the received indication. The indication may indicate indirectly that the radio resource scheduled for UL transmission is for the type of data by indicating that high priority data should not be transmitted on the radio resource scheduled for UL transmission and the UE 10, the processing circuitry 801, and/or the transmitting unit 804 may be configured to avoid transmitting high priority data on the radio resource. The UE 10, the processing circuitry 801, and/or the transmitting unit 804 may be configured to use the radio resource under the restriction indicating that pre-emption of transmissions is not allowed for a logical channel, and wherein data of such logical channel is not allowed to be transmitted when the indication is received and pointing at the radio resource of the UL grant. The UE 10, the processing circuitry 801, and/or the transmitting unit 804 may be configured to use the radio resource by transmitting data on the radio resource subject to pre-emption, if pre-emption probability is less than x %. The UE 10, the processing circuitry 801, and/or the transmitting unit 804 may be configured to use the radio resource in that the UE 10, the processing circuitry 801, and/or the transmitting unit 804 may be configured to avoid multiplexing high priority uplink control information onto a best-effort PUSCH transmission.

The UE 10 further comprises a memory 807. The memory comprises one or more units to be used to store data on, such as RSs, strengths or qualities, indications, SR, applications to perform the methods disclosed herein when being executed, and similar. The UE 10 comprises a communication interface comprising one or more antennas.

The methods according to the embodiments described herein for the UE 10 are respectively implemented by means of e.g. a computer program product 805 or a computer program, comprising instructions, i.e., software code portions, which, when executed on at least one processor, cause the at least one processor to carry out the actions described herein, as performed by the UE 10. The computer program product 805 may be stored on a computer-readable storage medium 806, e.g. a universal serial bus (USB) stick, a disc or similar. The computer-readable storage medium 806, having stored thereon the computer program product, may comprise the instructions which, when executed on at least one processor, cause the at least one processor to carry out the actions described herein, as performed by the UE 10. In some embodiments, the computer-readable storage medium may be a non-transitory or a transitory computer-readable storage medium.

Figure 5:
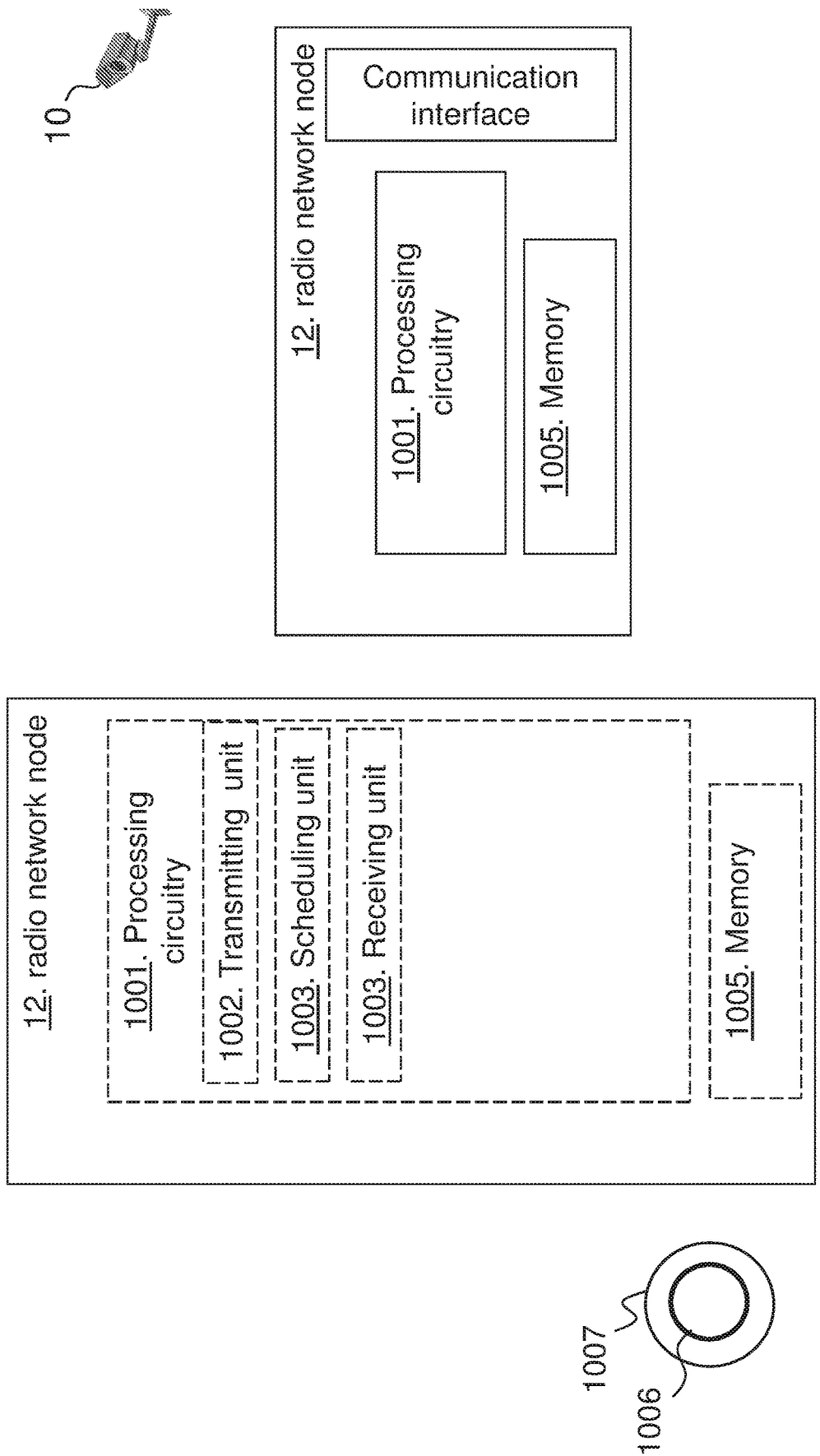
FIG. 5 is a block diagram depicting a radio network node according to embodiments herein.

FIG. 5 is a block diagram depicting the radio network node 12, in two embodiments, for handling, e.g. handling communications such as scheduling radio resources for UL communication from the UE 10, in the wireless communication network 1 according to embodiments herein. UEs with different traffic types may be in the network:

UEs may belong to group C of UEs (e.g., URLLC), which have critical traffic,

UEs belonging to group E of UEs (e.g., eMBB), which have non-critical traffic with lower priority traffic than those considered critical traffic.

UEs belonging to group M of UEs (from Mix), which have mixed critical and non-critical traffic.

The radio network node 12 may comprise processing circuitry 1001, e.g. one or more processors, configured to perform the methods herein.

The radio network node 12 may comprise a scheduling unit 1003, such as a scheduler. The radio network node 12, the processing circuitry 1001 and/or the scheduling unit 1003 is configured to schedule a user equipment, UE, with a radio resource for an uplink, UL, data transmission, wherein a first radio resource is more reliable in transmission than a second radio resource, wherein the first radio resource and the second radio resource are scheduled for different types of data traffics. E.g. The radio network node 12, the processing circuitry 1001 and/or the scheduling unit 1003 may be configured to schedule UL transmission so that it might preempt some of the UL transmissions scheduled for groups of UE-E or UE-M.

The radio network node 12 may comprise a transmitting unit 1002, such as a transmitter or transceiver. The radio network node 12, the processing circuitry 1001 and/or the transmitting unit 1002 is configured to transmit the indication to the UE 10. The radio network node 12, the processing circuitry 1001 and/or the transmitting unit 1002 is configured to send the indication with the uplink grant to the UE 10, when scheduling the radio resource for the UL data transmission, wherein the indication indicates that the scheduled radio resource for the UL data transmission is for a type of data. When scheduling means that the indication may be sent during the scheduling but after allocating the radio resource. The indication may indicate indirectly that the radio resource scheduled for the UL transmission is for the type of data by indicating that high priority data should not be transmitted on the radio resource scheduled for UL transmission and the UE avoids transmitting high priority data on the radio resource. The indication may be indicating the radio resource to be pre-empted by other data transmissions and/or the radio resource that is not robust. The radio network node 12 may be configured with a restriction indicating that pre-emption of transmissions is not allowed for a logical channel, and wherein data of such logical channel is not allowed to be transmitted when the indication is received pointing at the radio resource of the UL grant. The indication may be a warning message transmitted on a higher-layer, to indicate a time-frequency resource that is subject to pre-emption of transmissions. The indication may include a time duration for which the indication is valid. The indication may indicate that the UE 10 avoids multiplexing high priority uplink control information onto best-effort PUSCH transmission. The indication may indicate the radio resource to be subject to pre-emption.

The radio network node 12 may comprise a receiving unit 1004, e.g. a receiver or transceiver. The first radio network node 12, the processing circuitry 1001 and/or the receiving unit 1004 may be configured to receive data on the radio resource to be pre-empted if pre-emption probability is less than x %. The first radio network node 12, the processing circuitry 1001 and/or the receiving unit 1004 may be configured to receive from the UE 10 data on the radio resource, wherein the data is of the certain type related to the sent indication.

The radio network node 12 further comprises a memory 1005. The memory comprises one or more units to be used to store data on, such as strengths or qualities, indication, scheduling information, applications to perform the methods disclosed herein when being executed, and similar. The radio network node 12 comprises a communication interface comprising transmitter, receiver, transceiver and/or one or more antennas.

The methods according to the embodiments described herein for first radio network node 12 are respectively implemented by means of e.g. a computer program product 1006 or a computer program product, comprising instructions, i.e., software code portions, which, when executed on at least one processor, cause the at least one processor to carry out the actions described herein, as performed by the first radio network node 12. The computer program product 1006 may be stored on a computer-readable storage medium 1007, e.g. a USB stick, a disc or similar. The computer-readable storage medium 1007, having stored thereon the computer program product, may comprise the instructions which, when executed on at least one processor, cause the at least one processor to carry out the actions described herein, as performed by the first radio network node 12. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

Measurement Reference Signal (MRS): As used herein, a "MRS" is any signal used for mobility measurements in Mobility measurement beams. Thus, while the term "MRS" is used herein to refer a signal used herein, the term "MRS"

is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 6:
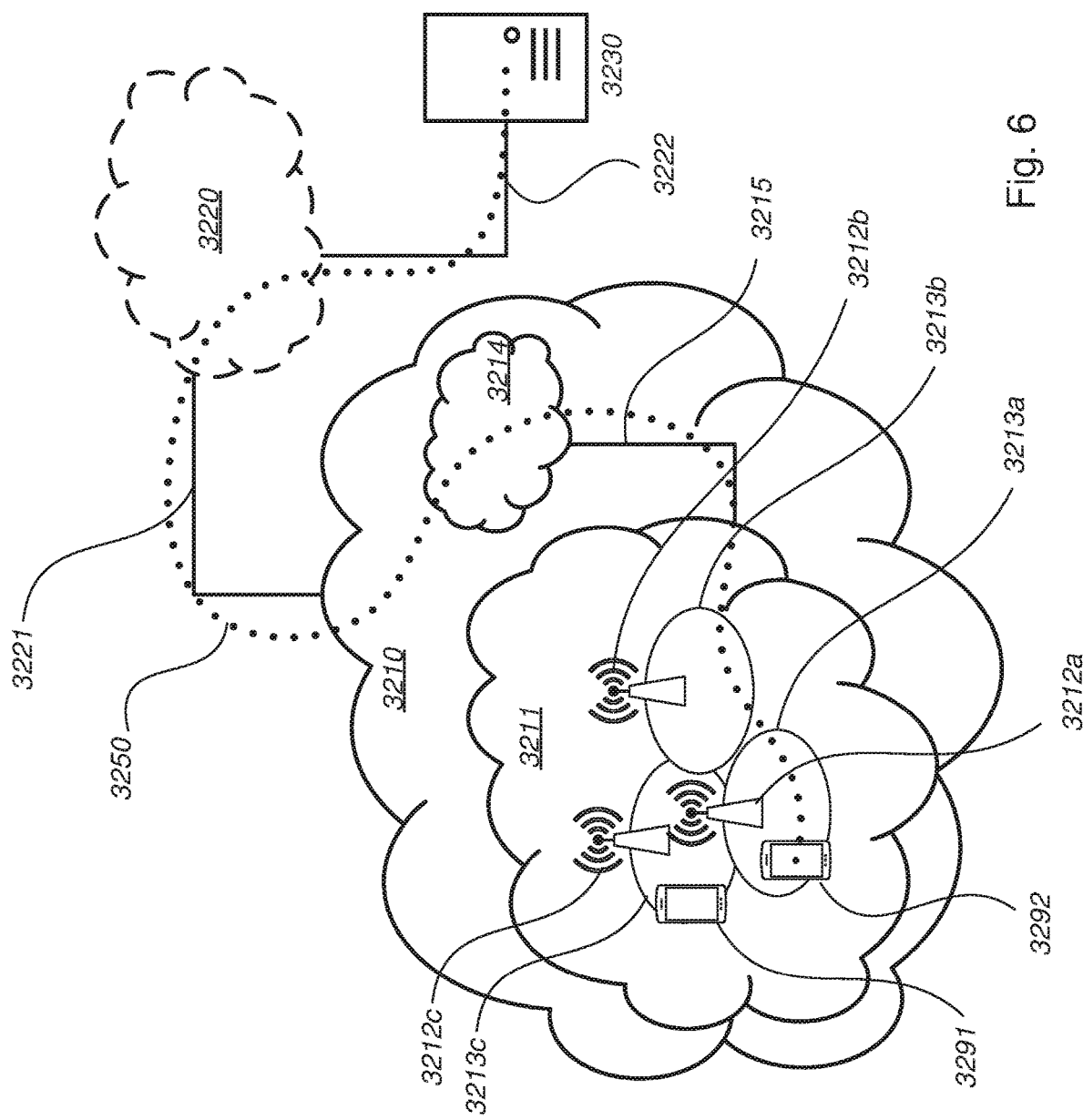
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes 12,13 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
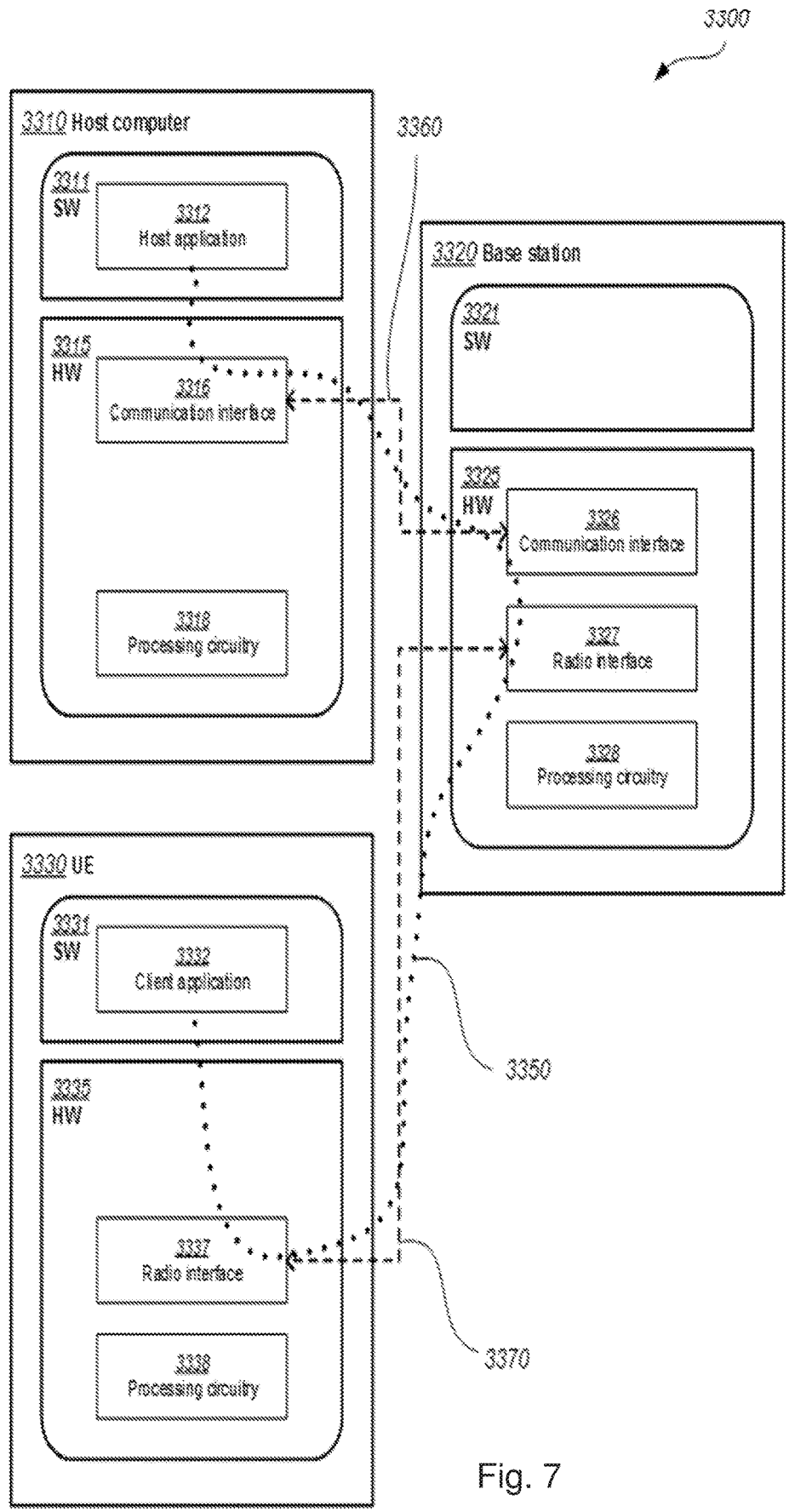
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since prioritized data may be sent on reliable resources and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 8, 9:
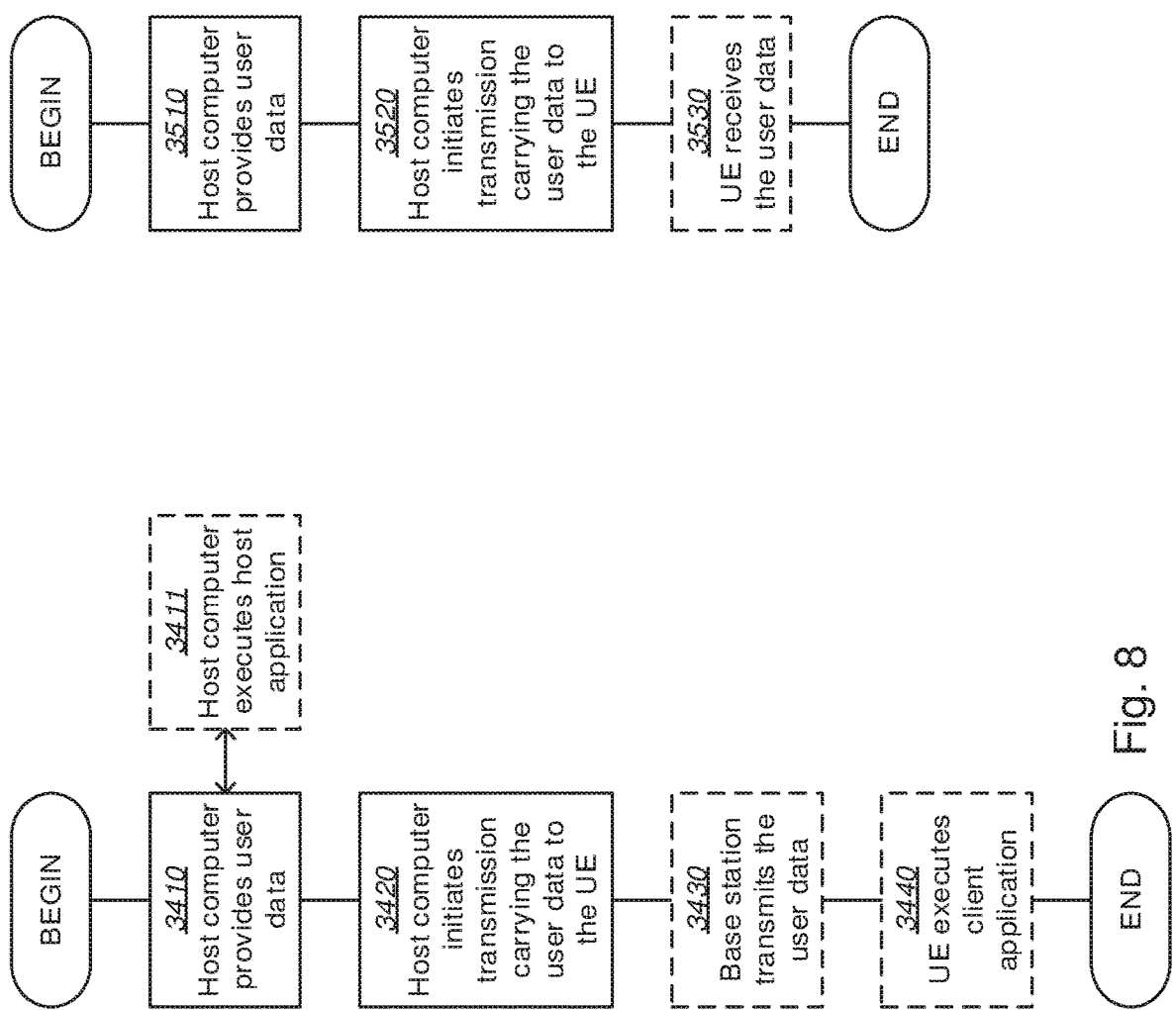

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

ACK Acknowledged
ADC Analog-to-digital conversion
AGC Automatic gain control
ANR Automatic neighbour relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests
MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RF Radio frequency
RLM Radio link monitoring
RNC Radio network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signalling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex Tx Transmitter
UARFCN UMTS Absolute Radio Frequency Channel Number
UE User equipment
UL Uplink

The invention claimed is:

1. A method performed by user equipment, UE, for handling uplink, UL, communications in a wireless communication network, the method comprising:
receiving from a radio network node, an indication with an uplink grant, wherein the indication indicates that a radio resource scheduled by the uplink grant is for UL transmission of a type of data, wherein the indication is dynamic according to the uplink grant, wherein the uplink grant is considered de-prioritized when the indication indicates that the uplink grant is cancelled; and
using the radio resource for transmission of that type of data.

2. The method according to claim 1, wherein the indication indicates indirectly that the radio resource scheduled for UL transmission is for the type of data by indicating that high priority data should not be transmitted on the radio resource scheduled for UL transmission and the UE avoids transmitting high priority data on the radio resource.

3. The method according to claim 1, wherein the indication is indicating the radio resource not to be used for high priority data transmissions and/or the radio resource that is not robust.

4. The method according to claim 1, wherein using is under a restriction whereby pre-emption of transmissions is not allowed for a logical channel, and wherein data of such logical channel is not allowed to be transmitted on the resource of the UL grant when the indication is received and indicates the resource of the UL grant is subject to pre-emption.

5. The method according to claim 1, wherein using comprises transmitting data on the radio resource subject to pre-emption, if pre-emption probability is less than x %.

6. The method according to claim 1, wherein the indication is a warning message transmitted on a higher-layer, to indicate a time-frequency resource that is subject to pre-emption.

7. The method according to claim 1, wherein the indication includes a time duration for which the indication is valid.

8. A method performed by a radio network node for handling communications in a wireless communication network, the method comprising:
scheduling a user equipment, UE, with a radio resource for an uplink, UL, data transmission, wherein a first radio resource is more reliable in transmission than a second radio resource, wherein the first radio resource and the second radio resource are scheduled for different types of data traffic; and
sending an indication with an uplink grant to a user equipment, UE, when scheduling the radio resource for the UL data transmission, wherein the indication indicates that the scheduled radio resource for UL data transmission is for a type of data, wherein the indication is dynamic according to the uplink grant, wherein the uplink grant is considered de-prioritized when the indication indicates that the uplink grant is cancelled.

9. A user equipment, UE, for handling uplink, UL, communications in a wireless communication network, wherein the UE is configured to:
receive from a radio network node, an indication with an uplink grant, wherein the indication indicates that a radio resource scheduled by the uplink grant for UL transmission is for a type of data, wherein the indication is dynamic according to the uplink grant, wherein the uplink grant is considered de-prioritized when the indication indicates that the uplink grant is cancelled; and
use the radio resource for transmission of that type of data.

10. The UE according to claim 9, wherein the indication indicates indirectly that the radio resource scheduled for UL transmission is for the type of data by indicating that high priority data should not be transmitted on the radio resource scheduled for UL transmission and the UE is configured to avoid transmitting high priority data on the radio resource.

11. The UE according to claim 9, wherein the indication is indicating the radio resource not to be used for high priority data transmissions and/or the radio resource that is not robust.

12. The UE according to claim 9, wherein the UE is configured to use the radio resource under a restriction indicating that pre-emption of transmissions is not allowed for a logical channel, and wherein data of such logical channel is not allowed to be transmitted when the indication is received and pointing at the radio resource of the UL grant.

13. The UE according to claim 9, wherein the UE is configured to use the radio resource by transmitting data on the radio resource subject to pre-emption, if pre-emption probability is less than x %.

14. The UE according to claim 9, wherein the indication is a warning message transmitted on a higher-layer, to indicate a time-frequency resource that is subject to pre-emption of transmissions.

15. The UE according to claim 9, wherein the indication includes a time duration for which the indication is valid.

16. The UE according to claim 9, wherein the UE is configured to use the radio resource in that the UE is configured to avoid multiplexing high priority uplink control information onto a best-effort physical uplink shared channel, PUSCH, transmission.

17. The UE according to claim 9, wherein the indication indicates the radio resource to be subject to pre-emption.

18. A radio network node for handling communications in a wireless communication network, wherein the radio network node is configured to:
schedule a user equipment, UE, with a radio resource for an uplink, UL, data transmission, wherein a first radio resource is more reliable in transmission than a second radio resource, wherein the first radio resource and the second radio resource are scheduled for different types of data traffic; and
send an indication with an uplink grant to the UE, when scheduling the radio resource for the UL data transmission, wherein the indication indicates that the scheduled radio resource for the UL data transmission is for a type of data, wherein the indication is dynamic according to the uplink grant, wherein the uplink grant is considered de-prioritized when the indication indicates that the uplink grant is cancelled.

19. The radio network node according to claim 18, wherein the indication indicates indirectly that the radio resource scheduled for the UL transmission is for the type of data by indicating that high priority data should not be transmitted on the radio resource scheduled for UL transmission and the UE avoids transmitting high priority data on the radio resource.

20. The radio network node according to claim 18, wherein the indication is indicating the radio resource subject to pre-emption and/or the radio resource that is not robust.

21. The radio network node according to claim 18, configured with a restriction indicating that pre-emption of transmissions is not allowed for a logical channel, and wherein data of such logical channel is not allowed to be transmitted when the indication is received pointing at the radio resource of the UL grant.

22. The radio network node according to claim 21, wherein the radio network node is further configured to
receive data on the radio resource to be pre-empted if pre-emption probability is less than x %.

23. The radio network node according to claim 18, wherein the indication is a warning message transmitted on a higher-layer, to indicate a time-frequency resource that is subject to pre-emption of transmissions.

24. The radio network node according to claim 18, wherein the indication includes a time duration for which the indication is valid.

25. The radio network node according to claim 18, wherein the indication indicates that the UE avoids multiplexing high priority uplink control information onto best-effort physical uplink shared channel, PUSCH, transmission.

26. The radio network node according to claim 18, wherein the indication indicates the radio resource to be subject to pre-emption.

* * * * *